United States Patent [19]

Farina

[11] Patent Number: 5,225,132
[45] Date of Patent: Jul. 6, 1993

[54] PROCESS AND APPARATUS FOR PRODUCING A MOLDED BODY OF PLASTIC MATERIAL

[76] Inventor: Richard C. Farina, 309 Schindler Dr., Brick Town, N.J. 08723

[21] Appl. No.: 743,230

[22] Filed: Aug. 9, 1991

[51] Int. Cl.⁵ .................. B29D 23/20; B29C 43/02; B29C 43/18
[52] U.S. Cl. .................. 264/148; 156/244.18; 156/244.24; 264/150; 264/151; 264/152; 264/153; 264/154; 264/157; 264/241; 264/263; 425/116; 425/302.1; 425/324.1; 425/348 S; 425/393; 425/395; 425/398
[58] Field of Search ............... 264/138, 325, 150, 148, 264/151, 152, 145, 157, DIG. 41, 267, 241, 148, 153, 154, 259, 241, 267, 268, 263, 119, 231, 258; 425/302.1, 309, 324.1, 348 R, 348 S, 392, 393, 394, 395, 313, 398, 383, 447, 116, 376.1, 116; 156/244.18, 244.24, 516

[56] References Cited

U.S. PATENT DOCUMENTS

| | | | |
|---|---|---|---|
| 1,989,724 | 2/1935 | Villanyi | 425/398 |
| 2,484,965 | 10/1949 | Slaughter | 264/150 |
| 2,878,513 | 3/1959 | Slaughter | 264/DIG. 41 |
| 2,942,407 | 6/1960 | Morin | 425/DIG. 34 |
| 2,958,904 | 11/1960 | Morin | 425/DIG. 34 |
| 2,961,708 | 11/1960 | Morin | 425/DIG. 34 |
| 2,999,273 | 9/1961 | Gronemeyer | 425/577 |
| 3,172,933 | 3/1965 | Flax | 264/325 |
| 3,264,392 | 8/1966 | Zaplin | 264/231 |
| 3,313,875 | 4/1967 | Magerle | 264/267 |
| 3,711,230 | 1/1973 | Magerle | 425/126.1 |
| 3,816,585 | 6/1974 | Edwards | 264/297.6 |
| 3,964,846 | 6/1976 | Bliss | 249/65 |
| 4,352,775 | 10/1982 | Magerle | 264/500 |
| 4,388,263 | 6/1983 | Prunty | 264/257 |
| 4,512,836 | 4/1985 | Tucci | 264/258 |
| 4,559,194 | 12/1985 | Hegenstauer | 264/113 |
| 4,593,870 | 6/1986 | Cronkhite et al. | 264/119 |
| 4,640,673 | 2/1987 | Takeda et al. | 425/348 R |
| 4,663,810 | 5/1987 | Kramer | 264/258 |
| 4,753,761 | 6/1988 | Lindenberger | 264/28 |
| 4,767,302 | 8/1988 | Okamoto et al. | 425/398 |
| 4,834,638 | 5/1989 | Miyahara | 425/116 |
| 4,931,006 | 6/1990 | Schwyn et al. | 264/DIG. 41 |

Primary Examiner—Willard E. Hoag
Attorney, Agent, or Firm—Clifford G. Frayne

[57] ABSTRACT

A continuous, non-hesitant apparatus and process for producing a molded body of plastics material and for simultaneously securing the molded body to a tubular body by means of a plurality of heading units mounted in series on a continuous conveyor, each heading unit having a mold cavity associated with the mold arm slidably positionable with respect to a mandrel arm having a mandrel, press rod and mold core secured thereto, the mold core and press rod in coaxial alignment with the mold cavity, each of which responsive to a camming surface, the tubular body positioned on the mandrel and brought in registration with a continuous web of hot plastics material which is positioned at one end of the tubular body, the tubular body and mold core then positioned within the mold cavity responsive to the camming surfaces for a time sufficient to form the molded body and secure the molded body to the tubular body, the molded body and tubular body then released from the heading unit, the heading unit recirculating to obtain another in a series of tubular bodies.

21 Claims, 11 Drawing Sheets

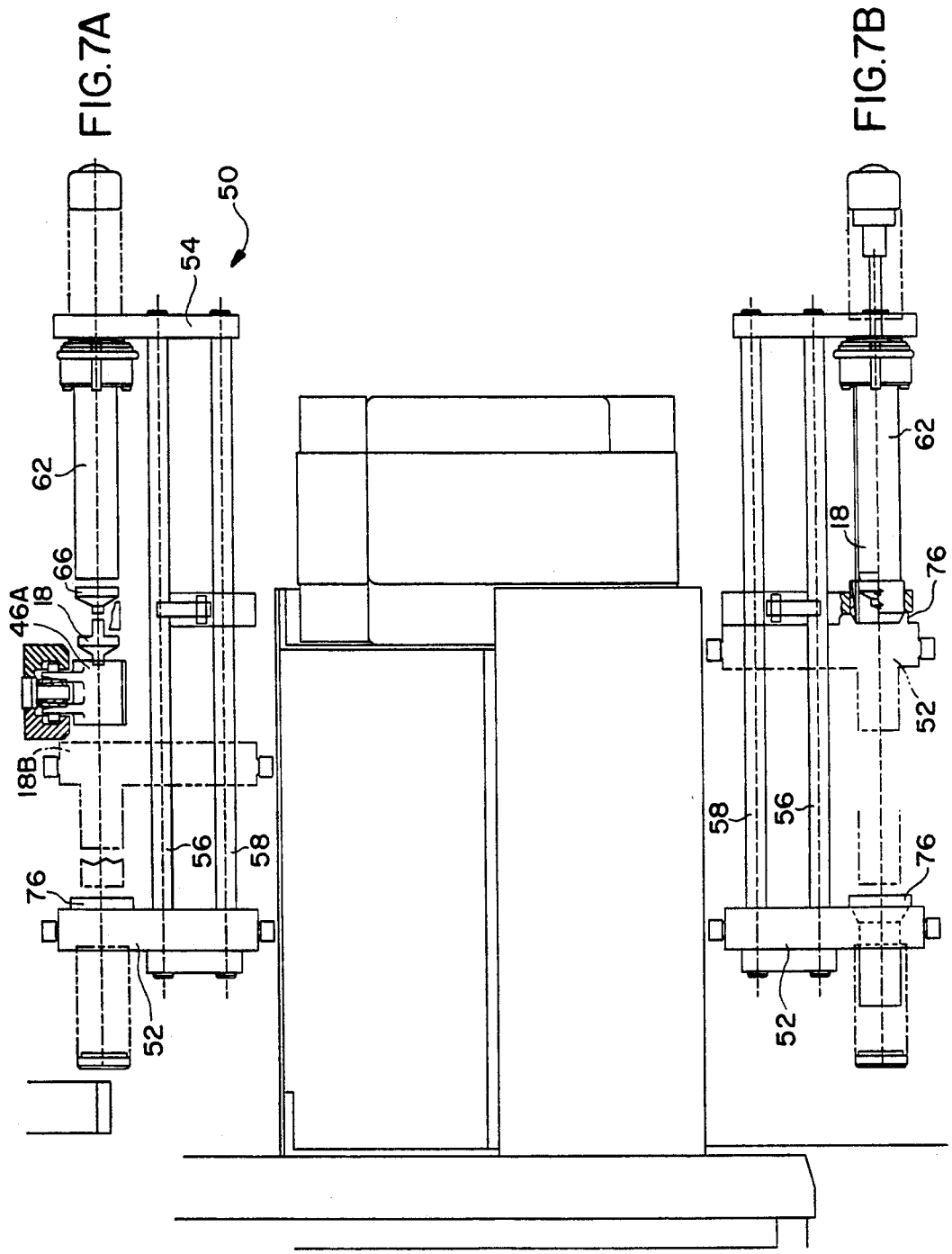

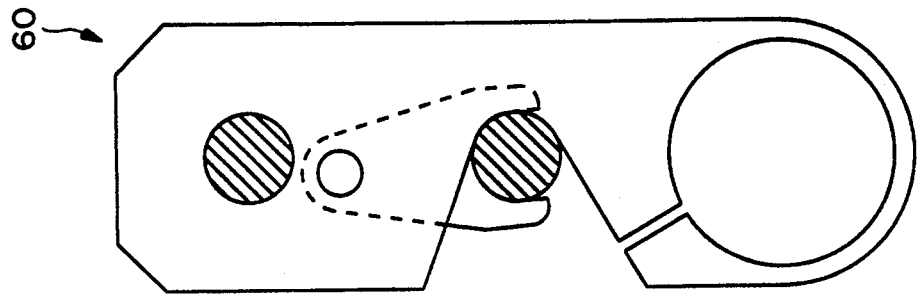
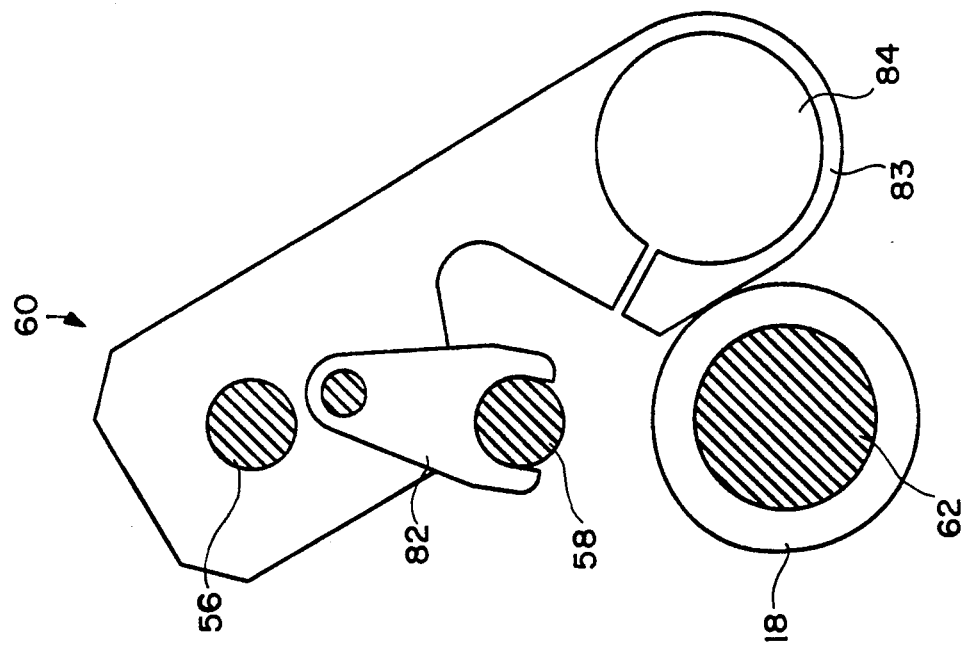
FIG.8B
FIG.8A

PROCESS AND APPARATUS FOR PRODUCING A MOLDED BODY OF PLASTIC MATERIAL

FIELD OF THE INVENTION

The invention relates to a process and apparatus for producing a molded head of plastic material and, in particular, to a continuous, low pressure system in which a tubular body is positioned on a mandrel and punch, one end of the tubular body positioned as such is brought into registration with a continuous web of plasticized plug material, the plasticized plug material being simultaneously cut and positioned in one end of the tubular body, the tubular body and plug then positioned in a moving mold aligned with the mandrel and punch for forming the molded head.

BACKGROUND OF THE INVENTION

Plastic containers having tubular bodies and shaped or molded heads such as toothpaste tubes and the like, are made from a variety of processes. The most common application is for the tubular body, to be positioned on a mandrel and brought into registration with a mold. The plastic material to make the shaped head is normally injected into the mold with the mandrel, punch and tubular body being brought into registration with the mold under pressure to form and seal the shaped head to one end of the tubular body.

In most instances, in the prior art, this is accomplished by means of one form of a rotary press or another. In particular, see U.S. Pat. No. 4,352,775 to Magerle; U.S. Pat. No. 3,816,585 to Edwards; U.S. Pat. No. 3,711,230 to Magerle; U.S. Pat. No. 2,999,273 to Gronemeyer; U.S. Pat. No. 3,172,933 to Flax; U.S. Pat. No. 4,834,638 to Miyahara; and U.S. Pat. No. 3,313,875 to Magerle and finally, U.S. Pat. No. 4,753,761 to Lindenberger.

The shortcoming in all of the aforesaid patents is that regardless of when the plastic material for forming the shaped head is introduced, each process requires a hesitation step wherein the mandrel and punch holding the tubular body is brought into registration with the mold and pressed into the mold in order to form the shaped head. Mass production is accomplished under these methods by using multiple mandrels and molds, but nevertheless, when each mandrel and punch holding a tubular member comes in contact with the mold, there are hesitation stops while the shaped head is formed, while the bodies are loaded and unloaded and while the mold is being pressurized.

It is Applicant's invention to eliminate this hesitation step and to continuously bring a tubular body into registration with the plastic material to form the shaped head, transfer the plastic material to one end of the tubular body and then to bring the tubular body and plastic material in registration with the mold to form the shaped head.

Applicant accomplishes this task and the elimination of the hesitation step by a plurality of heading units, each heading unit having a mandrel and punch, cutting means, and mold associated therewith, the mold, and mandrel and punch being activated by a low pressure system such that the heading unit continuously moves through the low pressure activation system, setting the shaped head and then releasing the tubular body and shaped head from the heading unit while the heading unit returns to a position to accept another tubular body and repeat the process.

OBJECTS OF THE INVENTION

An object of the present invention is to provide for an apparatus for producing molded plastic articles in which a tubular body and a shaped head are brought into registration by a heading unit having a mandrel and punch, cutter, and mold associated with each heading unit.

A further object of the present invention is to provide for a novel apparatus for producing molded plastic articles in which the shaped head is formed under pressure lower than that conventionally used.

A still further object of the present invention is to provide for an apparatus for producing molded plastic articles in which the speed of manufacture is limited only by the number of heading units utilized and the length of the curing section.

A still further object of the present invention is to provide for a novel apparatus for producing molded plastic articles in which the user can produce shaped bodies having longer necks than that conventionally possible.

A still further object of the present invention is to provide for a novel apparatus for producing molded plastic articles in which significantly more articles can be manufactured within a given time frame.

SUMMARY OF THE INVENTION

A method and apparatus for producing molded plastic articles in which a heading unit has positioned thereon, a mandrel and mold core, cutting means and mold cavity, the mandrel and mold core, and mold cavity cooperating to position a tubular body on the mandrel, one end of the tubular body then brought into registration with a continuous web of plastic material, the plastic material being positioned in one end of the tubular body and cut to the appropriate shape, the tubular body then brought back into registration with the mold cavity under low pressure for forming the molded head, the heading unit, comprising the mandrel and mold core, cutting means and mold cavity, moving in a continuous belt such that once the molded head is formed, the mold cavity and mandrel and mold core are brought out of registration and the tubular body and molded head are removed with the heading unit returning to a position for accepting a second tubular body, the endless belt contain- ing a plurality of heading units appropriate for the quantity of manufacture desired.

BRIEF DESCRIPTION OF THE DRAWINGS

These and other objects of the present invention will be readily evident upon a study of the following specification and the accompanying drawings wherein:

FIG. 7 is a top plan view illustrating the transfer and positioning of a tubular sleeve on the heading unit.

FIG. 8A is a partial side view of the cutting arm of the heading unit in a nonengaged position.

FIG. 8B is a partial side view of the cutting unit of the heading unit in an engaged position.

DETAILED DESCRIPTION OF THE DRAWINGS

Figure 1:
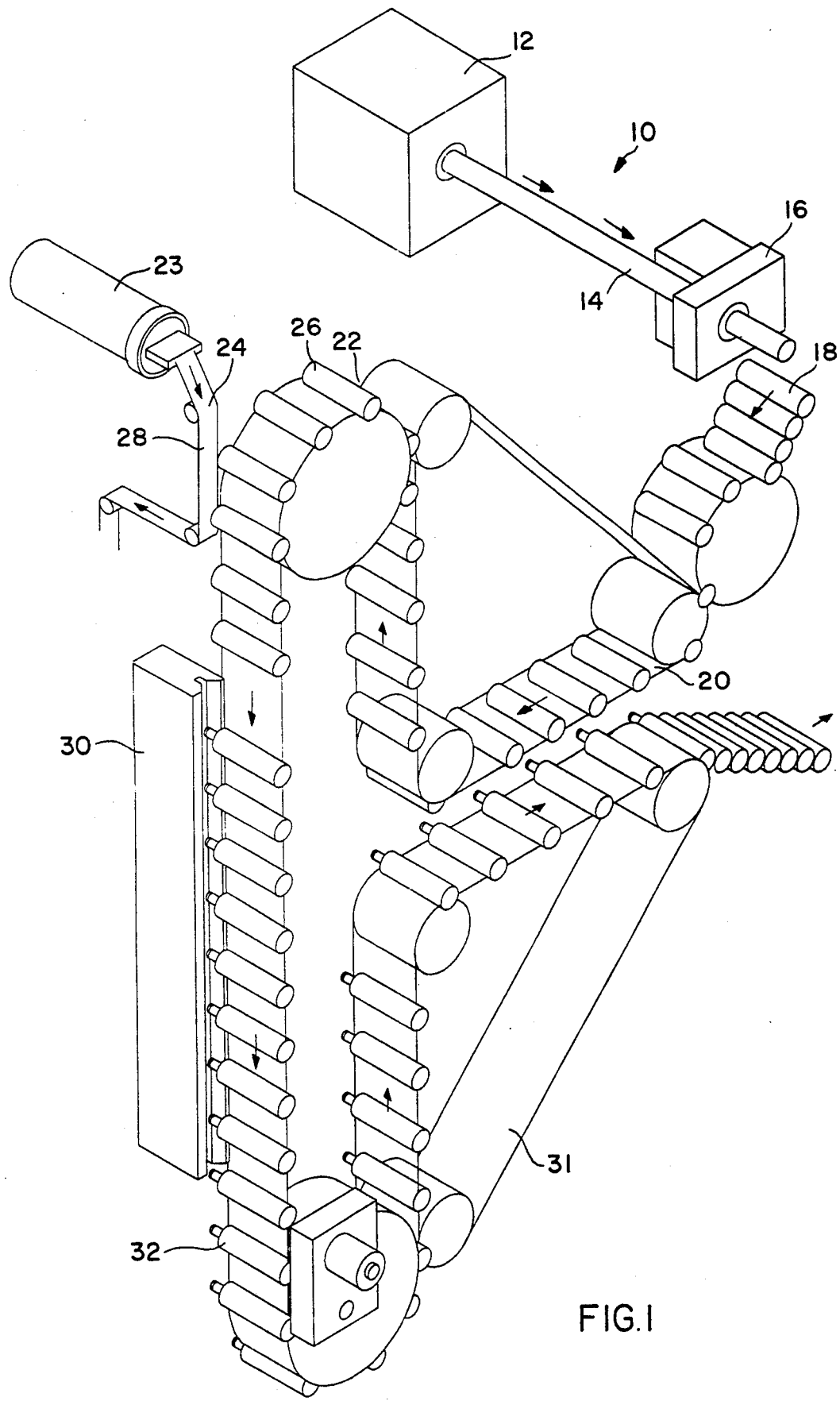
FIG. 1 is a functional perspective schematic of the overall apparatus.

Referring to FIG. 1, there is illustrated a functional schematic diagram of the overall apparatus 10 for producing a molded head of plastic material Apparatus 10 is a continuous inline heading system. The continuous inline heading system 10 is comprised of several distinct elements, each of which will be discussed in detail hereafter. The first element is a continuous extruder 12 for extruding continuous plastic tubing 14. Extruder 12 has a cutter 16 associated therewith which segments the continuous plastic tube 14 into a predetermined length resulting in a tubular sleeve 18. Tubular sleeve 18 is transferred via a continuous belt 20 from the extruder to a continuous inline header 22.

The transfer from constant conveyor belt 20 to continuous inline header 22 involves the transfer of the tubular sleeve 18 from its own individual retaining clip, not shown, on continuous conveyor 20, to an individual heading unit, not shown, each individual heading unit having positioned thereon, a mold, mandrel, and cutter. The heading unit will be more particularly described with reference to FIG. 4.

Tubular sleeve 18 positioned on the aforesaid heading unit is brought into alignment with a continuous extrusion of hot polymer melt 24 from polymer extruder 23. A first end 26 of tubular sleeve 18 is momentarily brought into intimate contact with the continuous web of hot polymer melt 24 and a plug of hot polymer melt 28 is positioned in first end 26 ©f tubular sleeve 18. Hot polymer melt web 24 is recycled within polymer melt head 22, remelted and reextruded for subsequent tubular sleeves 18.

Once hot polymer melt plug 28 has been positioned in first end 26 of tubular sleeve 18, tubular sleeve 18 then continues its travel on the heading unit and first end 26 of tubular sleeve 18 is positioned within the mold of the heading unit by means of external pressure exerted upon the mold arm of the heading unit and the hot polymer melt plug 28 is shaped to conform to the configuration of the mold mounted on the mold arm. This process as explained in detail hereafter, occurs in the cure area 30 illustrated in FIG. 1. During this entire process, the heading unit ia moving with each heading unit having a tubular sleeve 18 and hot polymer melt plug 28 positioned on a mandrel within a split mold.

Once the hot polymer melt plug 28 has set so as to conform to the configuration of the mold, the heading unit containing the tubular sleeve 18 and the now formed shaped head 32 exits the cure area 30 and is transferred from the heading unit to a second continuous belt 31 which transports the headed sleeve 18 to an unload station. The heading unit mounted on a continuous belt would return to engage a subsequent tubular sleeve 18 and transport tubular sleeve 18 to the polymer extruder to repeat the process.

FIG. 1 is a schematic intended to provide an overall conceptual understanding of the continuous inline heading machine 10. The individual components which allow for the performance of continuous inline heading machine 10 will be discussed hereafter.

Figure 2:
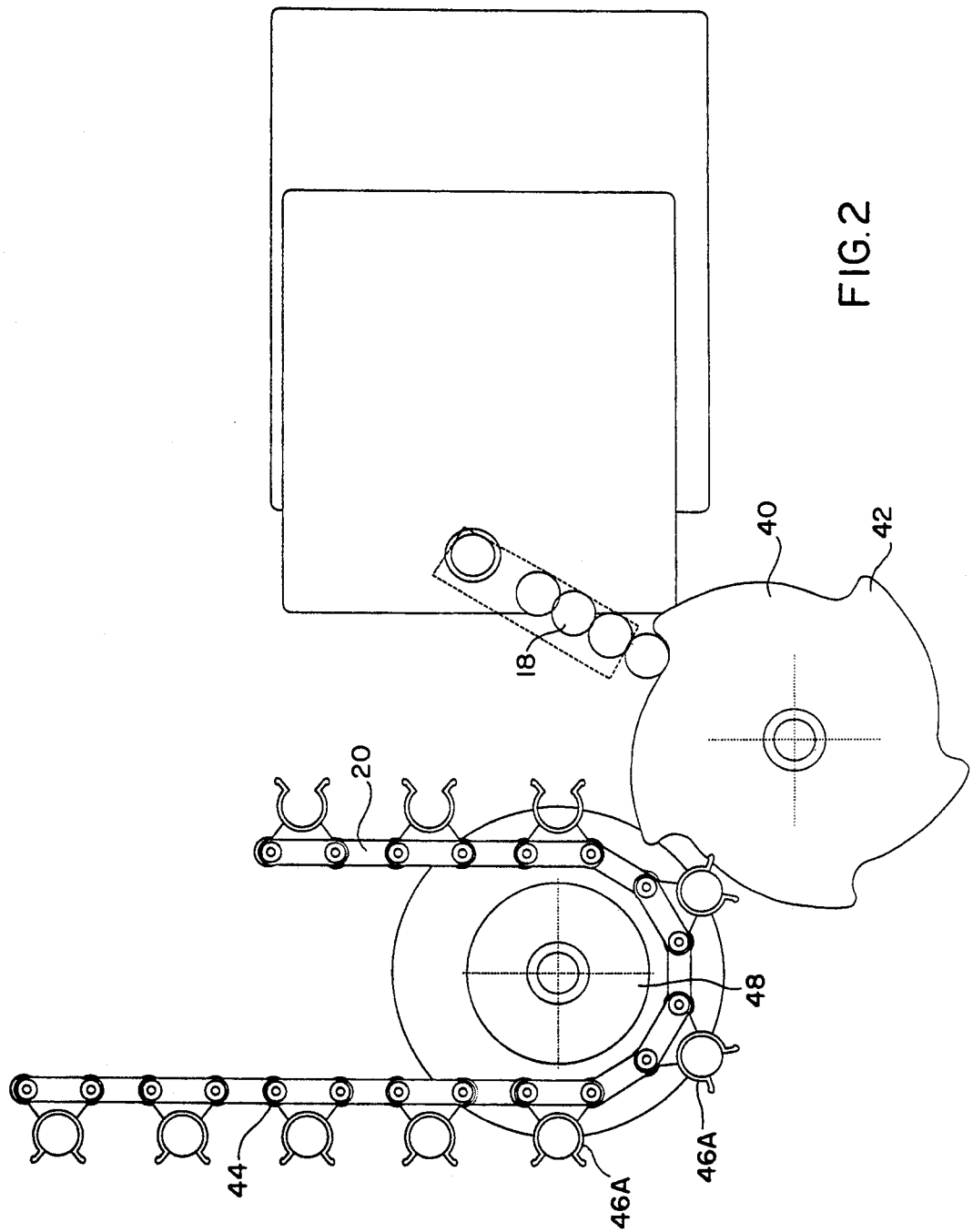
FIG. 2 is an elevational view illustrating the loading and transferring of tubular sleeves on a first conveyor means.

Referring to FIG. 2, a side end view illustrating the loading of tubular sleeves 18, there is shown a plurality of tubular sleeve 18 which have been formed in continuous tubular extruder 12 and cut to a predetermined length. Tubular sleeves 18 are then fed to a star wheel 40 which successively engages tubular sleeves 18 on one of a plurality of arcuate arms 42. Star wheel 40 then rotatably transports tubular sleeve 18 into engagement with a continuous conveyor 20 which is depicted in this embodiment as a chain link conveyor 44 having positioned thereon successive resilient retaining clamps 46. Empty retaining clamps 46 are brought into communication with star wheel 40 with arcuate arm 42 of star wheel 40 positioning a tubular sleeve 18 in engagement with resilient retaining clamp 46.

Figure 3:
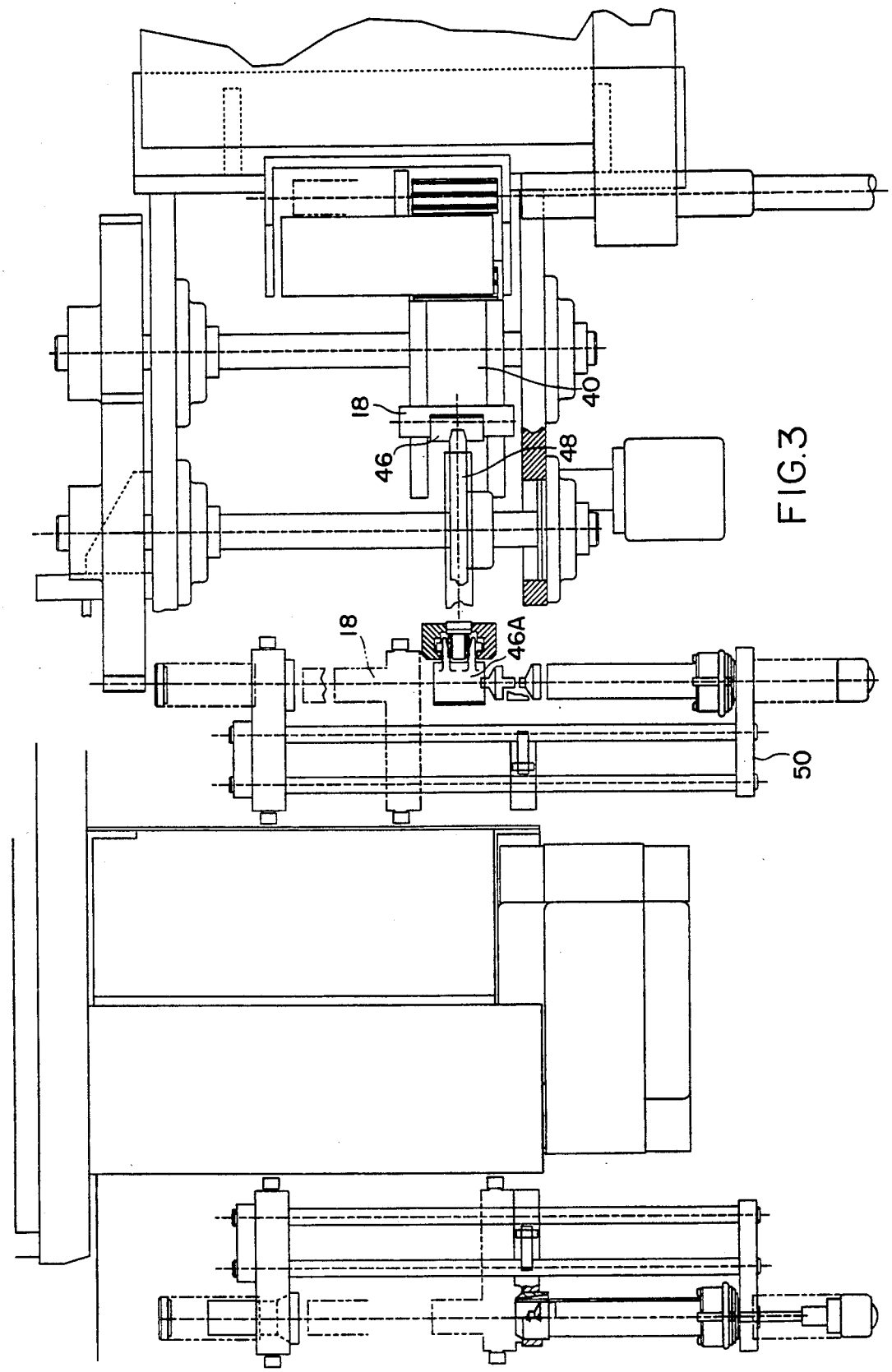
FIG. 3 is a top plan view illustrating the transfer of tubular sleeves from a first conveyor means to a second conveyor means comprised of a plurality of heading units.

FIG. 3 is a partial top plan view which in cooperation with FIG. 2 illustrates the transfer of tubular sleeve 18 to resilient retaining clamp 46. Star wheel 40 brings tubular sleeve 18 into communication with an empty resilient retaining clip 46 which is secured to a chain conveyor 20. An empty resilient retaining clamp 46 is brought into communication with star wheel 40 and tubular sleeve 18 is transferred to resilient retaining clamp 46. Conveyor 20 then conveys occupied resilient retainer clamp 46A and tubular sleeve 18 away from the loading station and star wheel 40 for engagement with heading unit 50.

Figure 4:
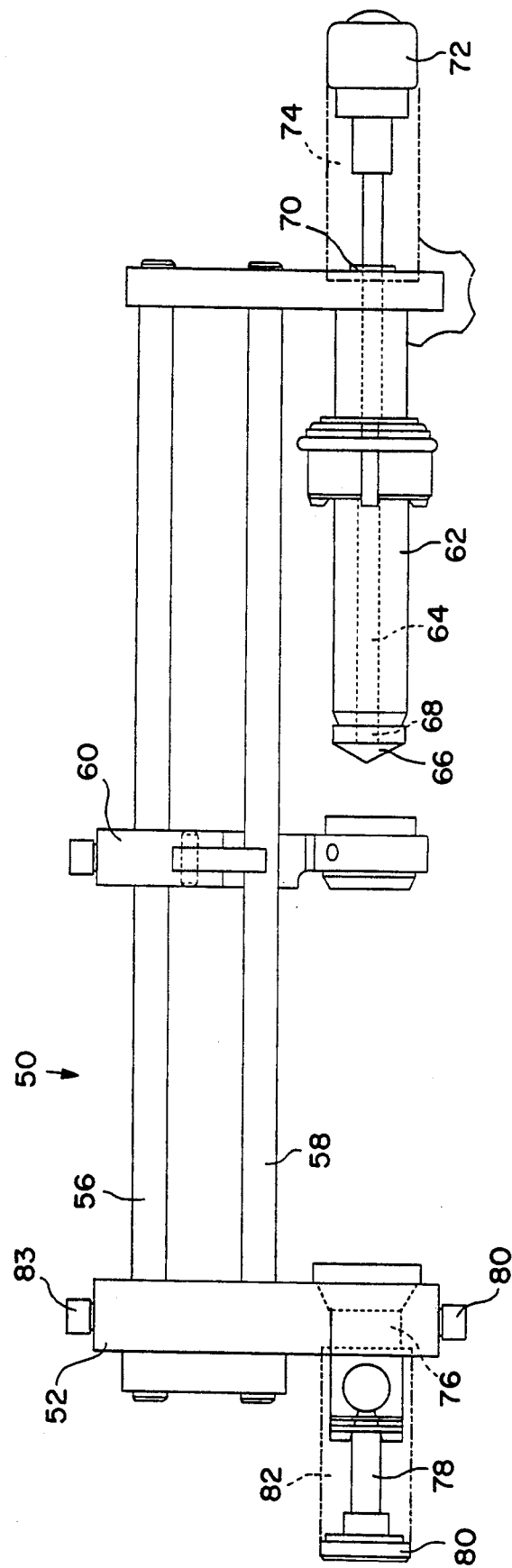
FIG. 4 is a top plan view illustrating the elements of the heading unit.

FIG. 4 illustrates a top plan view of heading unit 50. Heading unit 50 is comprised of a mold arm 52 and a mandrel arm 54 in slidable spaced apart relationship to each other, mounted on guide rods 56 and 58. Rotatably positioned on guide rod 56 is a cutter arm 60.

Additionally, there is secured to mandrel arm 54, a mandrel 62 extending from mandrel arm 54 toward mold arm 52. Slidably positioned within mandrel 62 is a press rod 64. Press rod 64 has a mold core 66 secured to its first end 68 and press rod 64 extends longitudinally through mandrel 62, and through an aperture 70 in mandrel arm 54, extending outwardly from mandrel arm 54 and terminating in a cam face 72 for contact with the pressure source described hereafter. Press rod 64 has a bias means 74 mounted on that portion of press rod 64 which extends outwardly from mandrel arm 54 to cam surface 72.

Aligned with mandrel 62, but mounted on mold arm 52 is a mold cavity 76. Mold cavity 76 has a longitudinally axially aligned orifice cutter 78 positioned therethrough and extending outwardly from mold arm 52 in communication with a traveling cam rest 80. Positioned between mold arm 52 and traveling cam rest 80 on orifice cutter 78 and mold 76 is a second biasing means 82. In this design, it can be seen that biasing means 74 and cam surface 72 on press rod 64 and biasing means 78 and molding cam surface 80 on orifice cutter 78 and mold 76 allow mold 76 and mold core 66 to move in axial relationship towards each other and away from each other. In addition, mold arm 52 is slidably mounted on guide bars 56 and 58 such that mold arm 52, mold 76, orifice cutter 78 and traveling cam rest 80 can move toward mandrel arm 54 maintaining mold 76 and mold core 66 in axial relationship with each other by means of cam surfaces 79 and 81 which are engaged by cam guide rails 83.

Figure 5:
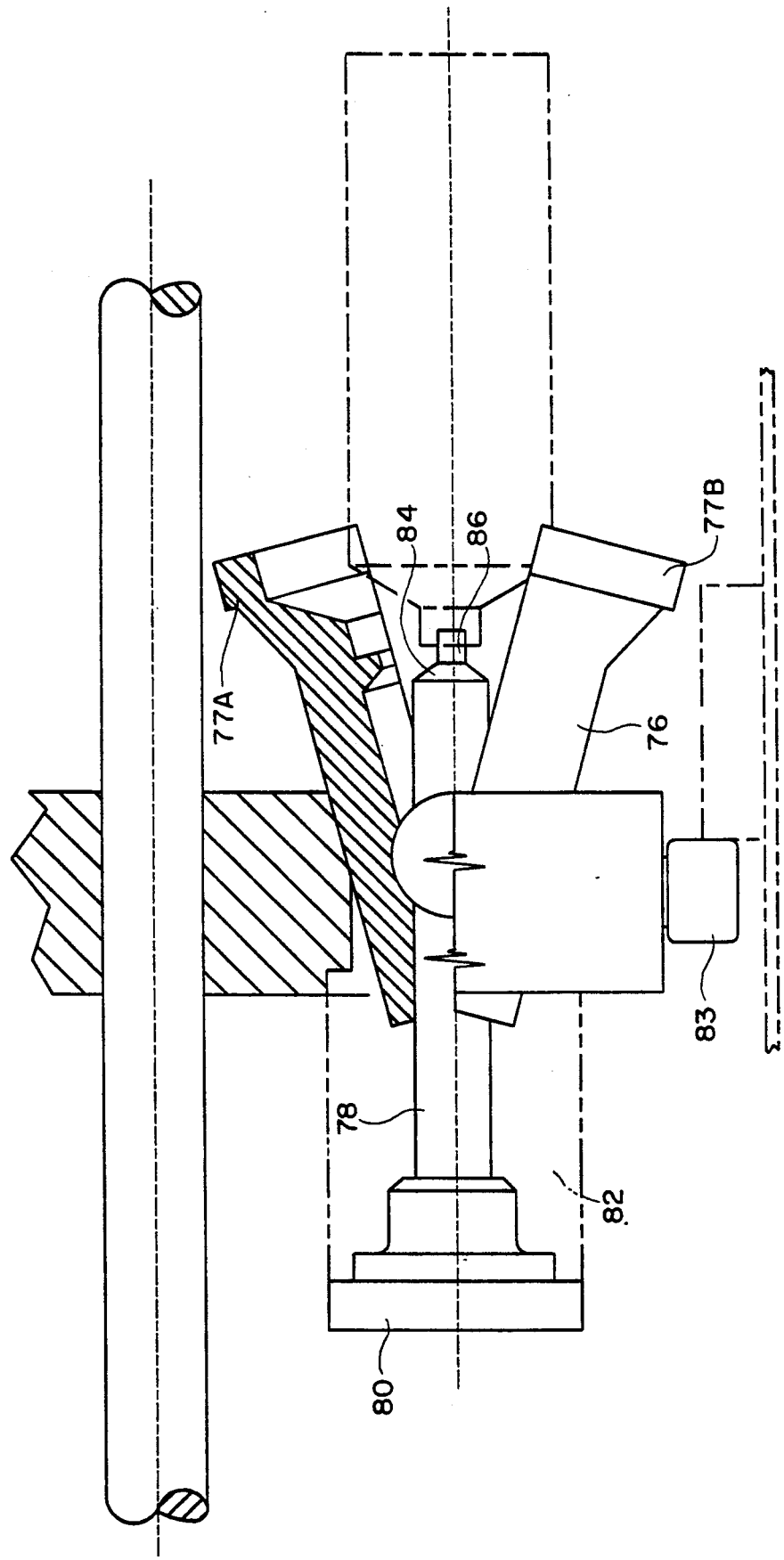
FIG. 5 is a side, partial cutaway view of the mold and mold arm of the heading unit.
Figure 6:
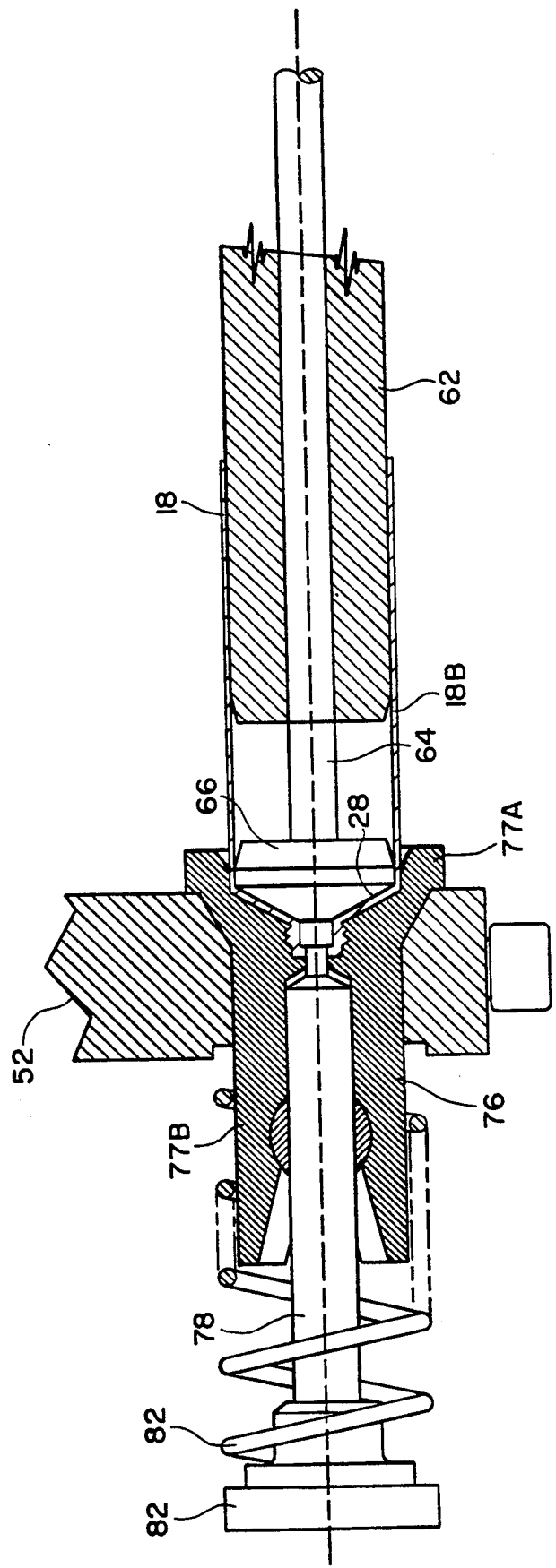
FIG. 6 is a side, partial cutaway view of the mold, mold arm and mandrel of the heading unit.

A better understanding of the operation of mold arm 52 and mold 76 can be found with reference to FIGS. 5 and 6 which are side partial cutaway views illustrating the relationship of mold 76 to mold arm 52. In FIG. 5, mold 76 is illustrated as a split mold comprised of two identical halves 77A and 77B. Mold 76 moves in conjunction with mold arm 52 on guide rods 56 and 58. The movement of mold arm 52 is governed by cam surface 79 and 81 and their engagement with cam guide rails 83 which move mold arm 52 toward and away from mandrel 62 as required. As illustrated in FIG. 5, mold 76 is opened to release tubular sleeve 18 at the conclusion of the mold process through the action of mold arm 52 moving against biasing means 82 in contact with traveling cam rest 80 thus allowing split halves 77A and 77B to separate. Orifice cutter 78, having a first end 84 having a protruding tip 86 is positioned in mold 76 in order to cooperative with mold core 66 for establishing an orifice in the molded shaped body as illustrated in FIG. 6 which is a partial side cutaway view of mold 76 in the closed or retracted position which illustrates its position during the molding process to be described in detail hereafter.

FIG. 7 is a top plan view illustrating the manner in which the heading unit 50 engages tubular sleeve 18 and removes it from retaining clip 46A on endless conveyor 20. In position A shown in FIG. 7, retaining clip 46A containing a tubular sleeve 18 is brought into tangential contact with a conveyor means containing a plurality of heading units 50. Tubular sleeve 18 is brought into tangential alignment with this conveyor means such that tubular sleeve 18 is in axial alignment with mandrel 62 and mold cavity 76. Mold cavity 76 and mold arm 52 are cam-activated to move axially on support rod 56 and 58 toward mandrel 62. Simultaneously, press rod 64 is cam-activated to move mold core 66 toward mold cavity 76. Mold core 66 engages a first end 18A of tubular sleeve 18 and mold cavity 76 engages a second end 18B of tubular sleeve 18. The tangential contact between endless conveyor 20 containing retaining clamp 46A and the conveyor containing the plurality of heading units 50 is simultaneously broken such that press rod 64 in cooperation with mold core 66 and mold cavity 76, having engaged the ends of tubular sleeve 18, frictionally disengage tubular sleeve 18 from retaining clamps 46A. As shown in position B, in FIG. 7, once tubular sleeve 18 has been disengaged from retaining clamps 46A, mold arm 52 and mold cavity 78 continue their axial displacement towards mandrel 62 while press rod 64 and mold core 66 are simultaneously withdrawn, thus forcing tubular sleeve 18 onto mandrel 62. Mold arm 52 and mold cavity 76 are then slidably returned on suide rods 56 and 58 to their original position. In interpreting postion A and position B in FIG. 7, the conveyor system upon which a plurality of heading units 50 are mounted has changed direction 180° and with the return of mold arm 52 to its original position, and the positioning of tubular sleeve 18 on mandrel 62, the second end 18B of tubular sleeve 18 is now positioned for receipt of a hot melt plug 28.

The preparation for receipt of the hot melt plug is best understood with reference to FIGS. 8A and 8B which are partial end views of cutter arm 60 in a non-engaged position in FIG. 8A and in an engaged position is FIG. 8B. FIG. 8A shows a cutter arm 60 rotatably mounted on guide rod 56 with a locking means 82 engageable with guide rod 58. In FIG. 8A, arm 83 having circular cutting surface 84 formed thereon, is not in axial alignment with mandrel 62 and tubular sleeve 18. Cutter arm 60 and, in particular, arm portion 83 and circular cutting surface 84 are brought into alignment with mandrel 62 and tubular sleeve 18 as shown in FIG. 8B only after tubular sleeve 18 has been mounted on mandrel 62 and is prepared for engagement with a continuous web of hot polymer melt 24. FIG. 4 illustrates cutter arm 60 rotated into alignment with mandrel 62 and tubular sleeve 18 just prior to the performance of this task.

Figure 9:
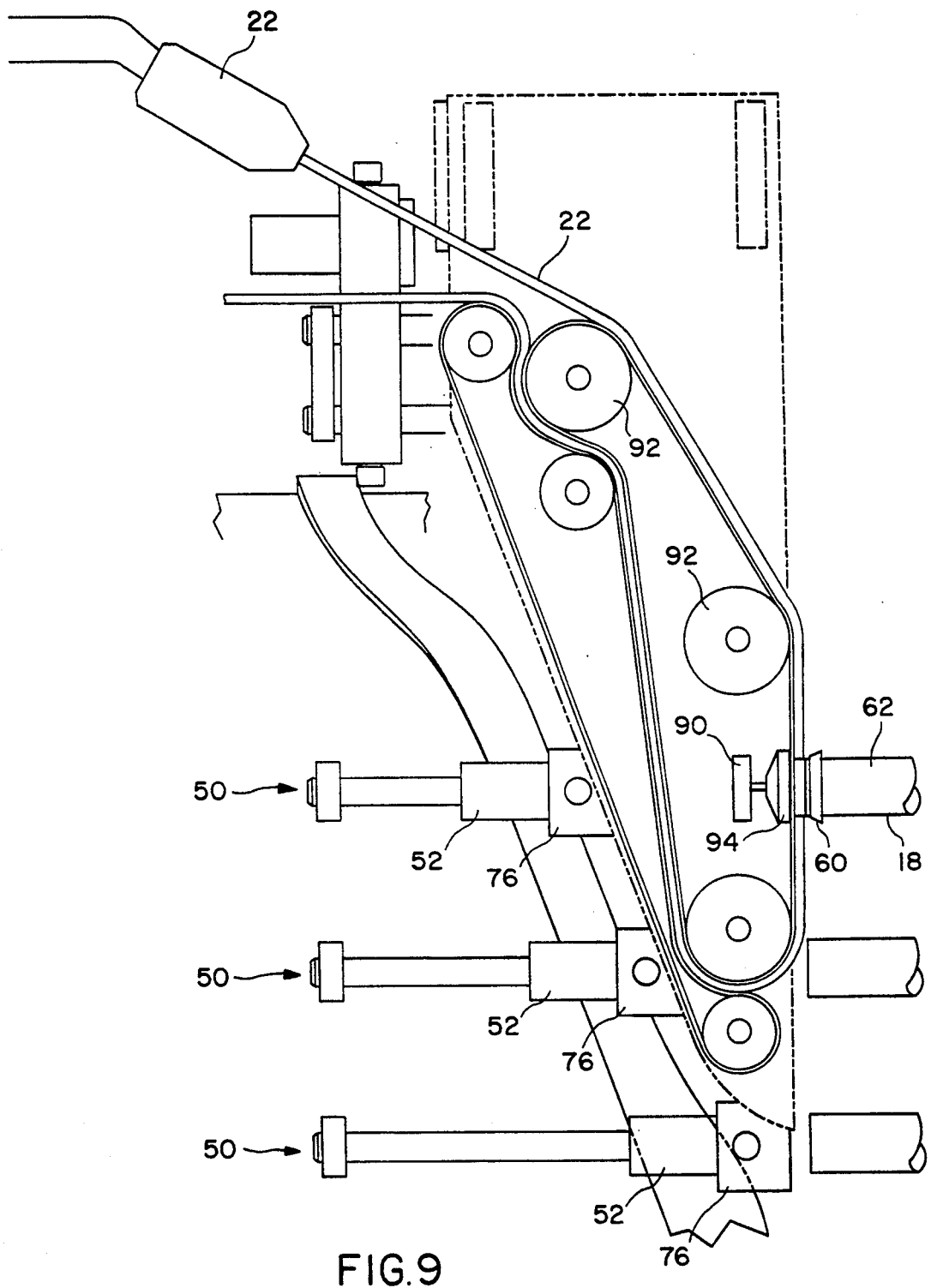
FIG. 9 is a side view illustrating the positioning relationship between the polymer melt head and the heading unit.

FIG. 9 is a partial side cuttaway view of polymer head 22, polymer melt web 24 and its relationship to the heading unit at the cutting station 90. The continuous hot polymer melt web 24 is extruded from polymer melt head 22 and passes over a plurality of idler pulleys 92 such that it is brought into alignment with cutting station 90. Cutting station 90 is a solenoid activated cutter pad 94. Mandrel 62 having tubular sleeve 18 mounted thereon and having cutter arm 60 positioned in axial alignment therewith, will travel into axial alignment with cutting station 90. Cutter pad 94 will move axially, in time sequence, toward mandrel 62 engaging hot polymer melt web 24 and contacting it with circular cutting surface 84 of cutter arm 60, thus depositing a circular hot polymer melt plug 28 in second end 18B of tubular sleeve 18. Cutter pad 94 is withdrawn and then repeats the same task with each successive mandrel 62 and tubular sleeve 18 mounted on each successive heading unit 50. FIG. 9 also illustrates that while the hot polymer melt plug 28 is being positioned in second end 18B of tubular sleeve 18, mold arm 52 and mold cavity 76 are moving axially towards mandrel 62. As described hereafter, this movement is performed in order to position mold cavity 76 for receipt of second end 18B of tubular sleeve 18 and hot polymer melt plug 28, for the molding and curing process as soon as the header arm has passed the cutting station.

Figure 10:
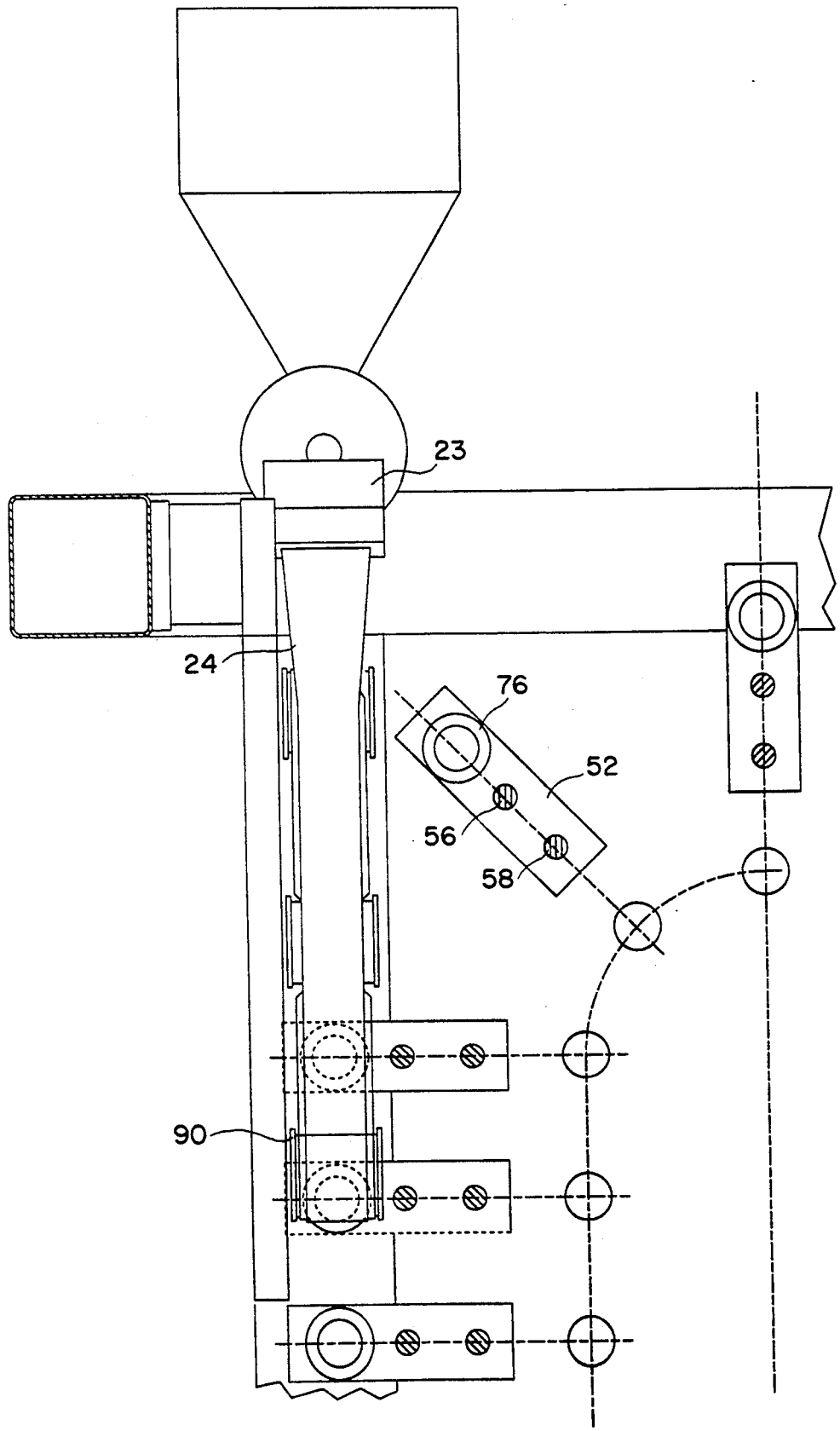
FIG. 10 is an end view illustrating the relationship between the polymer melt web and the heading unit.

FIG. 10 is an end view of the cutting station 90, hot polymer melt web 24 and polymer head 22. FIG. 10 also illustrates a partial view of the manner in which the heading unit 50 passes by the cutting station. In FIG. 10, only mold arm 52 and mold cavity 76, mounted on guide rods 58 and 56 are shown. That portion of the heading unit 50 passes behind the hot melt web 24 and as it passes downwardly, it commences its axial movement on guide rods 56 and 58 towards the mandrel arm 54 which is not shown.

Figure 11:
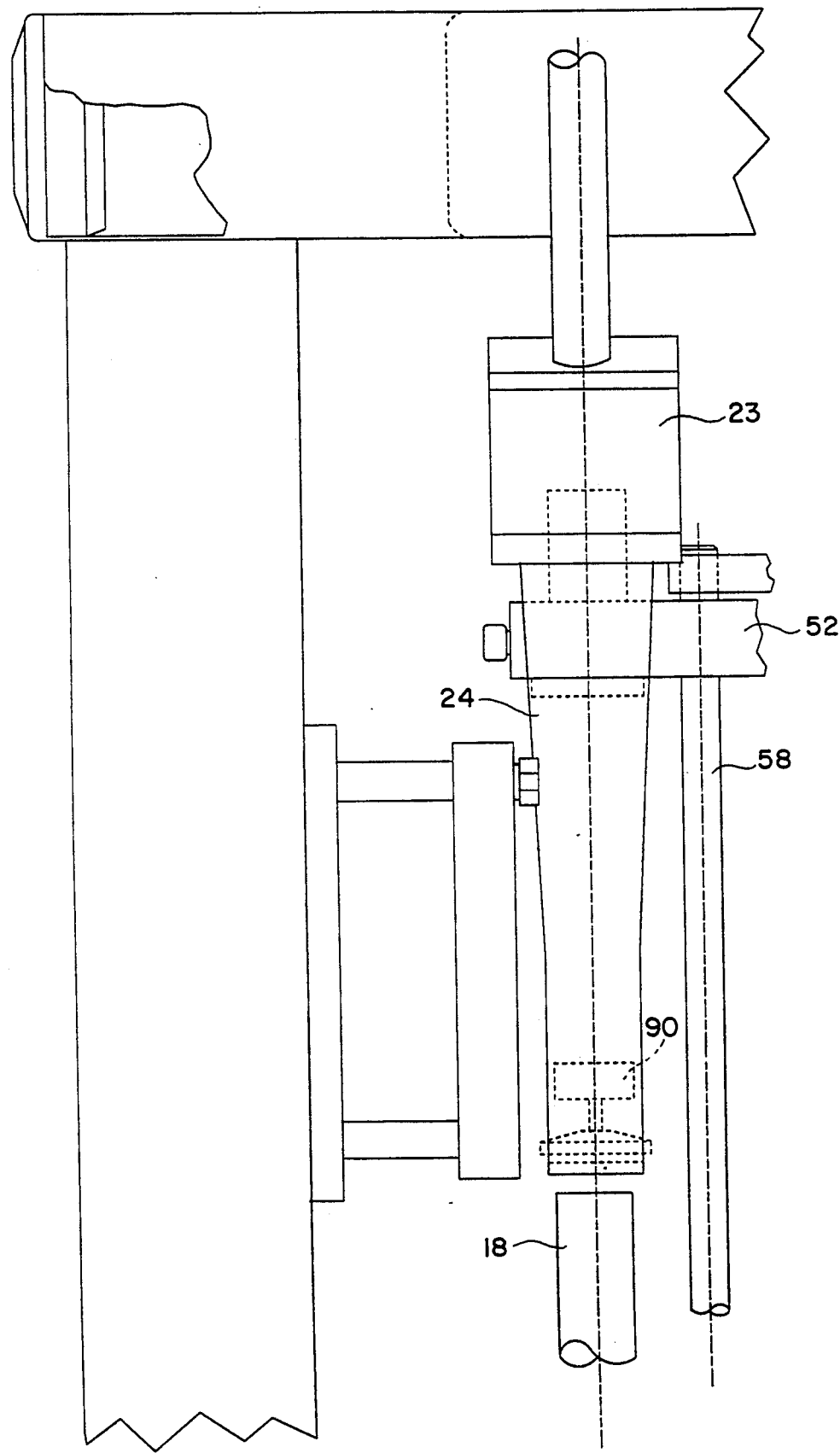
FIG. 11 is a partial top view illustrating the relationship between the polymer melt web and the heading unit.

FIG. 11 is a partial top view of the polymer head 22, hot melt web 24, and cutter station 90. FIG. 11 again illustrates the positioning of mold arm 52 on guide rod 58 as it passes behind the cutting station 90 and hot melt web 24. A portion of tubular sleeve 18 is shown positioned proximate to hot melt web 24 and cutting station 90 to illustrate the manner in which mandrel 62, not shown, and cutting arm 60, not shown, would cooperate in order to fix hot melt plug 28 in second end 18B of tubular sleeve 18. That portion of hot melt web 24 which was not positioned in second end 18B of tubular sleeve 18 would continue on its path and be returned to be remelted and reextruded as illustrated in FIG. 9.

Tubular sleeve 18 and hot melt plug 28 are now ready to be subjected to the molding process. Referring back to FIG. 6, there is illustrated mold arm 52 having axially moved with relationship to mandrel 62 so as to engage second end 18B of tubular sleeve 18. Second end 18B of tubular sleeve 18 and hot melt plug 28 are engaged in mold cavity 76. Press rod 64 is activated forcing mold core 66 into mold cavity 76 to form the desired shape. Press rod 64 was activated by a cam surface 72 and maintains mold core 66 in mold cavity 76 for a sufficient time to allow for the setting of the hot polymer melt plug 28. Simultaneously, orifice cutter 78 cuts a portion of the setting hot polymer melt plug 28 by means of cutting tip 86 to allow for an aperture in the shaped head for discharge of the contents of the tube once it is subsequently filled.

Once hot melt plug 28 has been set to form the tubular head, the heading arm was transported away from the cure area and it is now necessary to transfer tubular sleeve 18 to a subsequent conveyor belt for further operations. This is accomplished by the simultaneous retraction of press rod 64 and mold core 66 from mold 76 as a result of the release of tension on biasing means 74 and cam surface 72 on mandrel arm 54 and the simultaneous opening of mold core 76 as activated by the cooperation of traveling cam rest 80 and cam surface 83 and biasing means 82 of mold 76 to cause split section 77A and 77B to disengage. The aforesaid actions occur as the header arm comes into tangential contact with a subsequent conveyor belt 31 as shown in FIG. 1 which has similar retaining clamps 46 secured thereto which engage tubular sleeve 18 about its circumference and cause tubular sleeve 18 to be moved away from the heading unit at the point and time when the mold cavity is opened and the press rod is fully retracted. The heading unit is then returned to the load position to obtain another tubular sleeve 18 while tubular sleeve 18 having its molded shape secured thereto is transported either to a labeling station or filling station.

The continuous inline molding process presents several advantages over the prior art. First, it should be pointed out that while, as disclosed in FIG. 1, there are three distinct conveyor belts, conveyor 20 transporting the tubular sleeve 18 to the heading unit, the heading unit conveyor belt and conveyor 31, transporting the finished tube to a labeling or filling station, it is possible to activate and time all lines off of a power drive on the heading unit conveyor such that the loading of the header arm conveyor drives conveyor belt 20 and the unloading of the header arm conveyor drives conveyor belt 31. If so desired, each unit could have its own drive gear in timing relationship with the other respective conveyor belts.

The inline header as disclosed herein does not require the stop/start, hesitation cycle of insert injection molding machines which are rather large machines requiring multiple mold groups to overcome long cooling cycles and require high pressure molds with long lead times. Additionally, the inline header permits the heading of the tube and the creation of the orifice whereas the insert injection molding machine requires a second operation for the cutting of the orifice.

Similarly, the hot, preform compression molding method while conducted at medium pressure requires both costly and expensive precision machinery since the metering and transfer of the polymer plug is temperature critical. The hot preform compression molding suffers from its inability to manufacture tubular sleeves with heads having long necks whereas the inline header can manufacture varying neck lengths dependent solely upon the mold and the mold core design. Additionally, the hot preform compression molding technique requires the stop, start, hesitation in order to form the head.

The fused slug compression molding technique is accomplished under relatively low pressure, but still requires the stop, start, hesitation of the machine in forming the mold and is limited to the number of pieces per minute which can be manufactured under ideal conditions and suffers high reject rates when the orifice diameter required falls below 330 seconds of an inch.

The continuous inline header as compared to the indexing rotary machine allows for extremely high output rates with a broad spectrum of neck styles and can be adapted to diverse body shapes. It also permits very high length to diameter ratios with respect to neck lengths whereas the indexing rotary machine is limited. The maintenance and repair of the continuous inline header machine is relatively simple requiring no critical minor adjustments and easy access to all elements of the machine.

The drive motion of the continuous inline header is constant and the mold force required is in the neighborhood of 25 lbs. per square inch whereas the indexing rotary machine requires the intermittent, hesitation step in forming the mold head at a pressure of from 145 to 1,375 lbs. per square inch. Additionally, the mold release action of the continuous inline header is smooth and controlled whereas the hesitation step required by the indexing rotary machine results in a sudden release of the mold thus contributing to higher reject rates.

The Applicant has disclosed the exemplary embodiment of his process and apparatus. Reference has been made to a tubular mandrel and a tubular sleeve, but it will be recognized by one of ordinary skill in the art that the apparatus and process is capable of handling sleeves of a non-circular cross sectional area with the appropriate substitution of the mandrel arm, mold core and mold cavity. Similarly, the mold cavity and mold core can be dimensioned to provide for the formation of a molded body having a neck of varying lengths The same procedures and apparatus can be modified accordingly in order to accomplish the aforesaid.

Therefore, while the present invention has been described in connection with the exemplary embodiment thereof, it will be understood that many modifications will be apparent to those of ordinary skill in the art and that this application is intended to cover any adaptations or variations thereof. Therefore, it is manifestly intended that the invention by only limited by the claims and the equivalents thereof.

I claim:

1. A continuous non-hesitant process for producing a molded body of plastics material and for simultaneously securing said molded body to a tubular body, the process comprising the steps of:

transferring each of a series of tubular bodies to each of a series of heading units mounted on a continuous conveyor, each heading unit having a mold arm and a mandrel arm positioned thereon, said mold arm having positioned thereon a mold cavity, said mandrel arm having positioned thereon a tubular mandrel, said mold cavity and said tubular mandrel in coaxial alignment with each other, said mold arm and said mold cavity in slidable movable relationship with said tubular mandrel, said tubular mandrel having positioned therethrough, a press rod having a mold core positioned on its first end, said mold core substantially identical in cross sectional area to said mold cavity, said press rod having secured to its second end, a biasing means and cam means for the slidable movement of said press rod and said mold core;

positioning said tubular body on said mandrel through said slidable action of said mold arm;

registering said mandrel and said tubular body with a cutting means rotatably positioned on said heading unit;

registering said tubular body, said mandrel and said cutting means with a source of plasticized material;

cutting said portion of said plasticized material and positioning said plasticized material in said first end of said tubular body;

moving said cutting means out of registration with said mandrel and said tubular body;

moving said mold cavity into contact with said tubular body, said mandrel and said mold core;

pressing said mold core into said mold cavity thus shaping said molded body and securing said molded body to said tubular body;

displacing said mold core and said mandrel from said tubular body and releasing said molded body from said mold core and unloading said tubular body and said molded body from said heading unit.

2. A process in accordance with claim 1 comprising using said mold cavity on said mold arm and said mold core on said press rod to engage the ends of said tubular body and slide said tubular body onto said mandrel through the slidable action of said mold arm and said press rod, said slidable action of said mold arm and said press rod in response to camming surfaces on said mold arm and said press rod engaging external guide rails.

3. A process in accordance with claim 1 comprising using an external guide rail in communication with said cutting means to selectively position said cutting means in registration with one end of said tubular body and to remove said cutting means from registration with said one end of said tubular body.

4. A process in accordance with claim 1 comprising providing a continuous source of heated plasticized material in a continuous web, said continuous web of plasticized material selectively positioned in registration between said cutting means and a cutter pad, said cutter pad engaging said cutting means and positioning a portion of said plasticized material from said continuous web of plasticized material on said end of said tubular body.

5. A process in accordance with claim 1 comprising moving said mold cavity into contact with said tubular body having said plasticized material positioned thereon by means of said camming surfaces on said mold arm and said external guide rails and pressing said mold core on said press rod into said mold cavity by engagement of said camming surface of said press rod with said external guide rail to shape said molded body and secure said molded body to said tubular body.

6. A process in accordance with claim 1 comprising pressing said mold core into said mold cavity to form said molded body and simultaneously engaging an orifice cutter positioned in said mold core so as to form an orifice in said molded body.

7. A process in accordance with claim 1 comprising aligning a first conveyor means having a plurality of retaining clamps positioned thereon, each retaining clamp having a tubular body positioned therein, with said heading units for transferring said tubular bodies to said heading unit and aligning a second conveyor means having a plurality of said retaining clamps positioned thereon with said heading units for unloading said tubular body from said heading unit simultaneously with said displacement of said mold core and mandrel from said tubular body and the releasing of said mold cavity.

8. A process in accordance with claim 1 wherein said forming of said molded body and securing of said molded body to said tubular body is performed in an attitude in a range from a horizontal-oriented position of said heading unit and said tubular body to a vertical-oriented position of said heading unit and said tubular body.

9. An apparatus for producing in a continuous, non-hesitant manner, a series of molded bodies of plastic material and simultaneously connecting each of said molded body with an associated one of a series of tubular bodies, the apparatus comprising:

a first conveyor means, said first conveyor means having positioned thereon, a plurality of retaining clamps frictionally engageable with the circumference of said tubular body;

a second conveyor means, said second conveyor means having mounted thereon, a plurality of heading units, said heading units comprising a mold arm and a mandrel arm alignably secured by a plurality of guide rods, said mold arm slidably positioned on said guide rods in relationship to said mandrel arm, said mold arm having positioned thereon a mold cavity, said mandrel arm having positioned thereon, a tubular mandrel in coaxial alignment with said mold cavity of said mold arm, said mandrel arm having positioned therethrough, a press rod, said press rod having a mold core positioned on a first end thereof coaxially-aligned with said mold cavity, said press rod having a biasing means and first cam means positioned on said second end for communication with an external camming means for slidably positioning said press rod and said mold core, said mold arm having positioned thereon, a second camming means responsive to an external camming surface for slidably positioning said mold arm and said mold cavity on said guide rods in relationship with said mandrel arm, said heading unit further having positioned on said guide rods, a slidably-positionable, rotatable cutting means for selective registration with said tubular mandrel;

means for positioning said tubular body on said tubular mandrel;

means for positioning a plasticized material in said end of said tubular body;

a first external camming surface slidably positioning said mold arm and said mold cavity in communication with said first end of said tubular body positioned on said tubular mandrel and a second external camming surface slidably positioning said press rod and said mold core into said mold cavity, said first external camming surface and said second external camming surface maintaining said mold core in said mold cavity for a time sufficient to form said molded body and secure said molded body to said tubular body;

means for cutting an orifice in said molded body and simultaneously releasing the said molded body and said tubular body from said mold cavity and said mandrel and means transferring said molded body and said tubular body to a third conveyor means.

10. An apparatus in accordance with claim 9 wherein said external camming means comprises a series of guide rails separately engageable with camming surfaces positioned on said mold arm, said mandrel arm and said cutting means for selectively, slidably positioning said mold arm, said mandrel arm and said cutting means with respect to each other.

11. An apparatus in accordance with claim 9 wherein said means for positioning said tubular body on said tubular mandrel comprises the tangential alignment of said second conveyor means with said first conveyor means for the engagement of said mold core and said press rod and said mold cavity with the ends of said tubular body for frictional disengagement from said first conveyor means.

12. An apparatus in accordance with claim 9 wherein said means for positioning a plasticized material in said end of said tubular body comprises a continuous web of said plasticized material in registration with said cutting means and said tubular body and a cutting pad, said cutting pad selectively reciprocal to engage said continuous web of said plasticized material with said cutting means and said tubular body.

13. An apparatus in accordance with claim 9 wherein said means for cutting an orifice in said molded body comprises an orifice cutter positioned within said mold cavity, said orifice cutter contacting said mold core to form an aperture in said molded body.

14. An apparatus in accordance with claim 9 wherein said mold cavity is comprised of a split mold, said mold cavity in slidable relationship with said mold arm to allow for the opening and closing of said mold cavity.

15. An apparatus in accordance with claim 9 wherein said second conveyor means is operable in an attitude range from a horizontal-oriented position of said heading unit and said tubular body to a vertical-oriented position of said heading unit and said tubular body.

16. An apparatus for producing in a continuous non-hesitant manner, a series of molded bodies of plastics material and simultaneously conecting each molded body with an associated one of a series of tubular bodies, the apparatus comprising;
a mold arm having positioned thereon a mold cavity;
a mandrel arm having positioned thereon a tubular mandrel;
a frame comprising a plurality of guide rods having said mold arm and said mandrel arm mounted thereon, said mold arm having camming surfaces positioned thereon responsive to an external camming surface for slidable positioning said mold arm on said guide rods rods in relationship to said mandrel arm, said mold cavity and said tubular mandrel being in coaxial alignment;
a cutting means, slidably rotatably positioned on one of said plurality of said guide rods, said cutting means having a camming surface responsive to an external camming surface for selectively positioning said cutting means in registration with said mandrel;
a press rod slidably secured within said mandrel, said press rod having a first end having secured thereto, a mold core, substantially identical in cross sectional area with said mold cavity and in axial alignment therewith, said second end of said press rod extending through said mandrel arm and having positioned thereon a biasing means and cam surface responsive to an external camming surface for the slidable positioning of said press rod and said mold core;
a means for cutting an orifice in said molded body, said means comprising an orifice cutter mounted on said mold arm coaxially aligned with said mold cavity.

17. An apparatus in accordance with claim 16 wherein said mold arm, said mandrel arm, and said frame are mounted in series on a continuous conveyor for receiving said series of tubular bodies and registering said series of tubular bodies with a source of plasticized material.

18. An apparatus in accordance with claim 16 wherein said mold core on said press rod and said mold cavity in slidable axial alignment cooperate to form said molded body of said plastics material and to simultaneously connect said molded body to said tubular body responsive to said external cam surfaces, said external cam surfaces comprising guide rails cooperative with cam surfaces positioned on said mold arm and said mandrel arm.

19. An apparatus in accordance with claim 16 wherein said mold core and said mold cavity are in cooperative communication for a time sufficient to form said molded body and secure said molded body to said tubular body.

20. An apparatus in accordance with claim 16 wherein said mold cavity is a split mold opening and closing responsive to said slidable relationship of said mold arm and said mold cavity, said opening of said mold cavity and said withdrawing of said press rod and mold core cooperative in releasing said tubular body and said molded body secured thereto.

21. An apparatus in accordance with claim 16 wherein said apparatus is operable in attitude range from a horizontal-oriented position to a vertical-oriented position.

* * * * *